United States Patent [19]

Bauer et al.

[11] Patent Number: 5,023,972
[45] Date of Patent: Jun. 18, 1991

[54] SPARE WIPER ELEMENT

[75] Inventors: Kurt Bauer, Ingersheim; Eckhardt Schmid, Bietigheim-Bissingen, both of Fed. Rep. of Germany

[73] Assignee: SWF-Auto-Electric GmbH, Bietigheim-Bissingen, Fed. Rep. of Germany

[21] Appl. No.: 393,352

[22] Filed: Aug. 11, 1989

[30] Foreign Application Priority Data

Aug. 13, 1988 [DE] Fed. Rep. of Germany ....... 3827875

[51] Int. Cl.$^5$ ................................................. B60S 1/02
[52] U.S. Cl. ................................ 15/250.42; 15/250.31; 15/250.32; 15/250 R
[58] Field of Search ............... 16/109, 108; 15/250 R, 15/250.42, 250.36, 250.32, 250.31, 250.35, 245

[56] References Cited

U.S. PATENT DOCUMENTS

| 3,153,254 | 10/1964 | Lenz et al. | 15/250.42 |
| 3,233,273 | 2/1966 | Anderson | 15/250.42 |
| 4,271,558 | 6/1981 | D'Alba | 15/250.42 |
| 4,583,259 | 4/1986 | Will | 15/250.42 |

FOREIGN PATENT DOCUMENTS 2400574 7/1974 Fed. Rep. of Germany ... 15/250.42

Primary Examiner—Harvey C. Hornsby
Assistant Examiner—Gary K. Graham
Attorney, Agent, or Firm—Robert P. Seitter; J. Gordon Lewis

[57] ABSTRACT

A spare wiper element for a wiper blade and a method for the assembly of the spare wiper element. The spring bars are held in lateral grooves of a wiper rubber basic body and are secured by holding clamps lapping over the basic body of the wiper rubber during the assembly with the supporting yoke system.

14 Claims, 1 Drawing Sheet

U.S. Patent          June 18, 1991          5,023,972
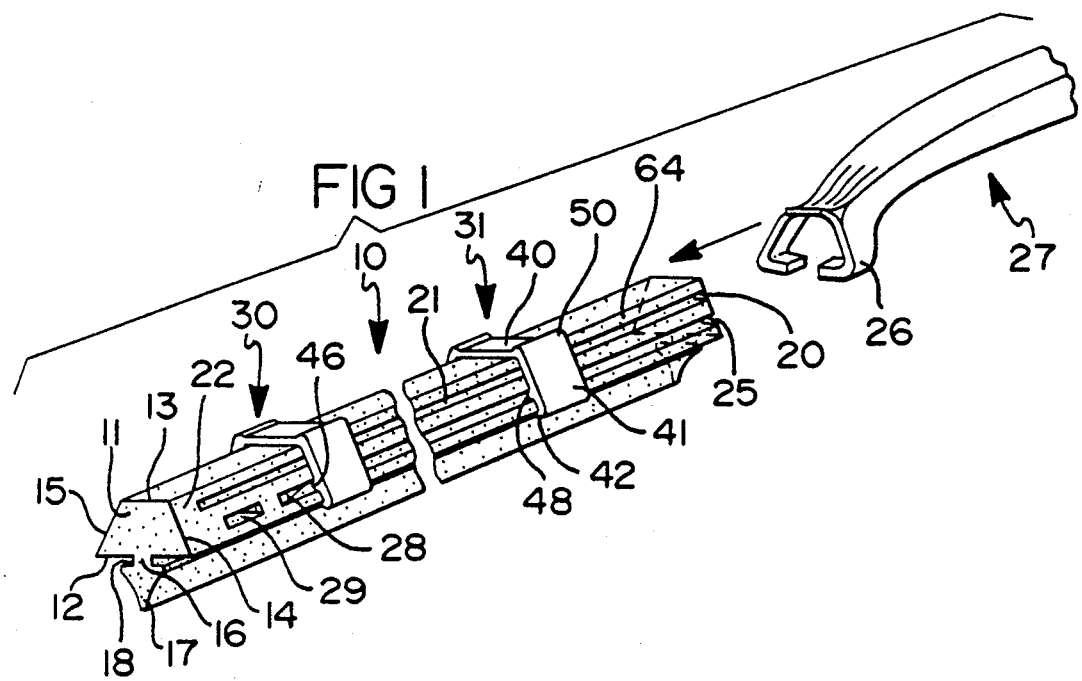
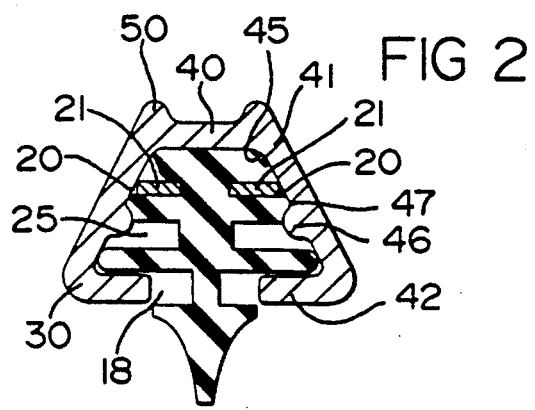
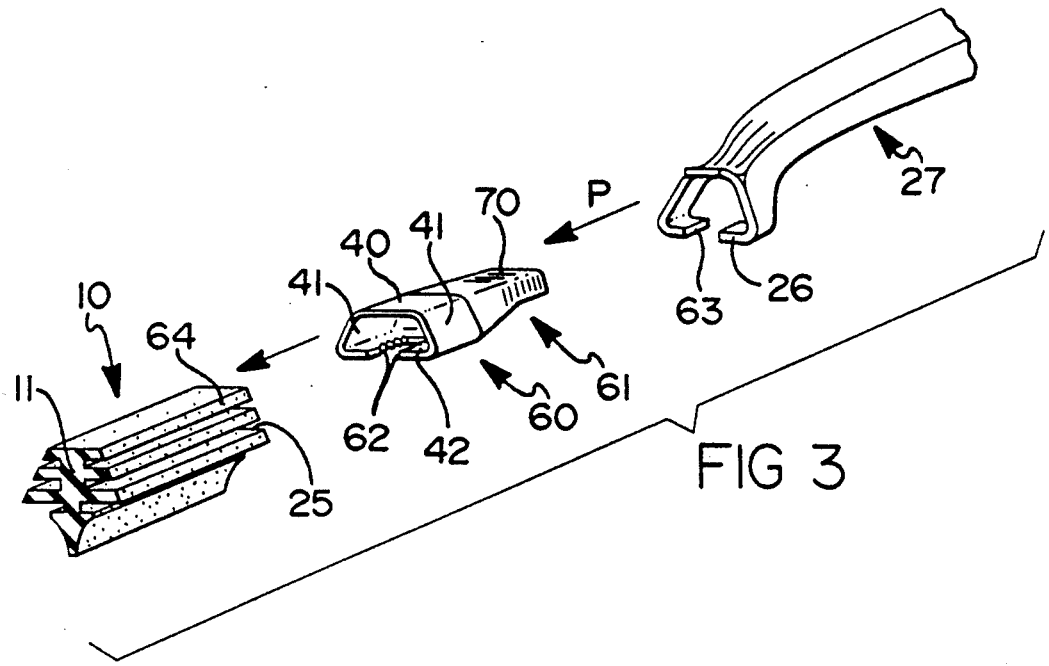

SPARE WIPER ELEMENT

BACKGROUND OF THE INVENTION

This invention relates to a spare wiper element for a wiper blade for motor vehicles, and to a method of mounting the spare wiper element in a wiper blade.

The wiper rubber element of typical wiper blades consists of a basic body and of a wiper lip which is held on the basic body by means of a tiltable web. The basic body includes a longitudinal groove on both sides, into which groove a spring bar is laterally inserted. The spring bar is protected against longitudinal displacement by holding elements on the wiper rubber element. In general a rib on the wiper rubber serves as a holding element, which rib engages laterally in a notch in the spring bar. The spring bars are secured against laterally removal from the longitudinal groove by holding claws on clawed yokes of a supporting yoke system carrying the wiper rubber element.

When the wiper blade has a construction of this type, manual assembly is carried out with difficulty. For this reason a spare wiper element consisting of wiper rubber and the two spring bars is rarely offered on the market for an exchange of the wiper elements originally installed as standard fittings. Accordingly, the completely assembled wiper blade normally is exchanged. This is preferred for reasons of safety, but on the other hand the cost involved is considerable.

The present invention therefore is directed to creating a spare wiper element for a wiper blade of this type which can be mounted relatively easily without special tools.

SUMMARY OF THE INVENTION

The present invention thereby is based on the recognition a main difficulty for the assembly is holding the curved spring bars in the longitudinal grooves of the basic body. However this difficulty is overcome if, according to the invention, the basic body is encompassed by at least one holding clamp which secures the spring bars during the assembly of the wiper in the longitudinal grooves transversely to the longitudinal direction. Thus a pre-assembled structural unit of wiper rubber element and spring bars held in the longitudinal grooves is provided.

In a preferred embodiment the holding clamp is held on the basic body of the wiper element in a longitudinally displaceably manner with a light-press fit. The press fit thereby also ensures that during transportation the pre-mounted spare wiper element is retained as a structural unit. The press fit thereby is selected in such a manner that a longitudinal displacement is ensured, so that after the assembly the holding clamp can be drawn off from the basic body of the wiper rubber element without undue difficulty. A construction of this kind is particularly advantageous when, according to a preferred development of the present invention, the spring bars are each held by a holding clamp in the end portion thereof.

However, even if the spare wiper element is supplied as a pre-mounted structural unit of wiper rubber element, spring bars and holding clamps, it is often difficult to insert the claws of the supporting yokes of the supporting yoke system in the respective grooves of the basic body of the wiper rubber element. To solve this problem in a preferred embodiment of the present invention, a holding clamp has a substantially conically ending mounting mandrel which projects over the end area of the wiper rubber element. Due to its conical end area with a cross section smaller than the interior space between the claws of a supporting yoke part this mounting mandrel can be pushed onto the supporting yoke system without difficulty.

The invention also relates to a method for the assembly of a wiper blade using a spare wiper element with a clamp or a mounting mandrel. In these mounting methods the spring bars inserted in the grooves of the basic body are at first secured against laterally displacement and, thereafter, the structural unit is fitted in the supporting yoke system. During assembly, the safeguarding elements which are formed as holding clamp are displaced in the longitudinal direction of the wiper blade until they fall away from the basic body, after the final assembly.

BRIEF DESCRIPTION OF THE DRAWING

The present invention and the advantageous embodiments thereof are described in greater detail on the following detailed description of the embodiments shown in the accompanying drawings, in which:

FIG. 1 is a perspective view on a spare wiper element and including on the end thereof a clawed yoke;

FIG. 2 is an enlarged representation of a section through a spare wiper element with holding clamp; and, FIG. 3 is a perspective representation of a holding clamp with a mounting mandrel and the end area of a clawed yoke.

DETAILED DESCRIPTION

In FIG. 1 a wiper rubber element is generally designated 10. This wiper rubber element has a basic body 11 with a base 12, a back surface 13 and two lateral surfaces 14 and 15. A tiltable web 16 projects from the base 12, by way of which web a wiper lip 17 is tiltably connected with the basic body 11. In the basic body 11 two guide grooves 20 for receiving a metallic spring bar 21 each are laterally incorporated. The longitudinal grooves 20 normally are closed on one side of the wiper blade and thus form a holding element 22 which protects the spring bar 21 against longitudinal displacement. If the longitudinal groove 20 is open at the other side in most cases a spring bar is used with a notch (not shown) which notch engages a rib laterally projecting from the longitudinal groove 20.

A further longitudinal groove 25 for receiving the claws 26 of the clawed yokes 27 is incorporated in the basic body. This longitudinal groove 25 also is closed on one side and by way of a slope 28 ends in a recess 29 in which, when the assembly is terminated, the outermost claw 26 engages in a form-fit manner with minimal play. The spring bars 21 are secured from falling out transversely to the longitudinal direction of the wiper rubber by these holding claws 26 of the supporting yoke system.

The two holding clamps 30 and 31 are essential for the present invention, and are arranged with a short distance from the end of the wiper rubber element 10. The exact construction of these holding clamps are fully illustrated in FIG. 2. According to FIG. 2, each holding clamp 30, 31 comprises a web 40 and lateral shanks 41 laterally projecting from web 40 as well as holding webs 42 bent from the ends of the lateral shanks. Web 40, the two lateral shanks 41 and the holding webs 42 border a space which is adapted to the trapezoid cross section of the basic body 11 of the wiper rubber, whereby the holding webs 42 engage behind the base 12 of the basic body 11, or in the groove 18 of the web. Thus these holding clamps 30, 31 encompass the basic body 11 of the wiper rubber 10 essentially completely.

The holding clamp 30, 31 are to be held on the basic body 11 of the wiper rubber 10 with light press fit in a longitudinally displaceable manner. This press fit is created by two measures. On the one hand the transition 45 between the web 40 and the lateral shanks 41 is rounded off in such a manner that there takes place a material deformation of the basic body 11 having an angled cross section. This is illustrated in FIG. 2. Furthermore, a bead 46 projects from the lateral shanks 41 of the holding clamp 30, 31, which bead engages in the guide groove 25 for receiving the claws 26 thereby deforming the border area 47. Thus part of the basic body 11 is locally deformed transversely to the longitudinal direction by the rounded-off transition 45 or the bead 46, so that the press fit for the holding clamp 30, 31 is realized. On the front face in the longitudinal direction of the wiper rubber the bead 46 has a slope 48 so that the holding clamp 30, 31 can glide over the slope 28 on the basic body 11 of the wiper rubber 10 without using an excessive force. Thus, in the assembly the function of the holding clamp is to an increasing extent performed by the claws 26 of the clawed yokes 27 pushing along the holding clamps. For this purpose, in the transition zones between the web 40 and the lateral shanks 41, ribs 50 protruding from the web surface are provided, on which ribs the clawed yoke abuts. Thereby, the spring bar 21 is prevented from falling out of the longitudinal grooves 20 of the wiper rubber of the wiper element. This feature is utilized both for transportation and for the assembly in the wiper blade frame.

When the wiper blades are mounted the claws 26 must engage in the respective guide grooves 25. This is ensured in a particularly simple way by a holding clamp 60 with mounting mandrel 61 according to and as illustrated in FIG. 3. In this construction according to FIG. 3, the holding webs 42 of the holding clamp 60 have a serration 62, by way of which in the axial direction the position between holding clamp and basic body 11 thereby is fixed. In contrast to the construction according to FIG. 1, the holding webs 42 of the holding claw according to FIG. 3 engages in the guide groove 25 for the claws 26 of the clawed yoke 27. The wall thickness of the holding clamp 60 is smaller than the usual spacing between the inner surfaces 63 of the claws 26 and the outer surfaces 64 of the basic body 11. The claw 26 thus can glide over the holding clamp 60.

The mounting mandrel designated 61, which is integrally formed with the holding clamp 60, has a cross section adapted to the interior space between the claws 26 of the clawed yoke 27. Thus, in the present construction the mounting mandrel also is trapezoidally formed and tapers in the manner of a cone towards its end area 70. Thus, a clawed yoke can be put without difficulty on this mounting mandrel in the direction of arrow P by means of its claw 26 and then be moved over the holding clamp 60. Then the claws 26 automatically engage in the right groove, that is the guide groove 25, into which the holding webs 42 also engage.

Thus, in this embodiment the spring bars 21 are at first laterally inserted in the longitudinal grooves 20 of the basic body 11. Then a holding clamp 30 is slipped over the basic body 11 closely to one end thereof. At the other end of the basic body a holding clamp 60 with the mounting mandrel 61 is fixed in such a manner that the mounting mandrel 61 projects over the end area of the wiper rubber 10. The thus pre-mounted structural unit of wiper rubber 10, spring bars 21, holding clamp 30 and holding clamp 60 with mounting mandrel 61, the mounting mandrel 61 first, is then inserted in the longitudinal direction in the claws 26 of a clawed yoke 27. The claws of the supporting yoke system thereby glide over the mounting mandrel 61 and the holding clamp 60, whereby the claw 26 automatically glides into the determined guide groove 25 in the wiper rubber 10. The end claw eventually abuts on the holding clamp 30 and pushes along the latter. If the end claw is then locked in the recess 29 when the position of supporting yoke system and wiper rubber 10 is assigned properly, the holding clamp 30 falls away from the basic body 11. Insofar as it is deemed necessary, the other holding clamp 60 with the mounting mandrel 61 can be removed from the wiper rubber 10. However, the holding clamp 60 may remain because in this end area of the wiper blade, which is normally covered by the wiper arm, a holding clamp is not an impediment. Finally it is pointed out that the holding clamp can be made from metal sheet or from plastic material, or any other suitable material.

What is claimed is:

1. A spare wiper element for a wiper blade, for motor vehicles, comprising a wiper rubber having a basic body and a wiper lip, which is held on the basic body by way of a tiltable web, and comprising two spring bars each of which is laterally inserted in an associated longitudinal groove worked into the basic body and are protected there against longitudinal displacement by integral holding elements on the wiper rubber and after the final assembly of the wiper blade are secured by holding claws on a supporting yoke system transversely to the longitudinal direction of the wiper rubber, wherein the basic body (11) of the wiper rubber (10) is encompassed by at least one holding clamp (30, 31) which secures the spring bars (21) in the longitudinal grooves during assembly of the wiper and wherein said holding clamp is removable after assembly of the wiper assembly by sliding it in said longitudinal direction.

2. A spare wiper element according to claim 1, wherein the holding clamp (30, 31) is held on the basic body (11) of the wiper rubber (10) with a press fit.

3. A spare wiper element according to claim 2, wherein the holding clamp (30, 31) includes a web (40) and lateral shanks (41) and of which each projects laterally from the web (40) and holding webs (42) bent from the ends of the lateral shanks (41) so that the said web (40) and the lateral shanks (41) and the holding webs (42) substantially border a space adapted to the cross section of the basic body (11) of the wiper rubber element (10), wherein said holding webs (42) engage behind a base (12) of the basic body (11).

4. A spare wiper element according to claim 3 wherein the transition between the web (40) and the lateral shanks (41) is rounded off so that a material deformation of the angled basic body (11) takes place, and wherein a bead (46) projects from the lateral shanks (41) of the clamp (30, 31), which bead engages in a guide groove (25) incorporated in the basic body (11) for receiving the claws (26) of the supporting yoke system thereby causing a deformation of the border area (47) on the guide groove (25).

5. A spare wiper element according to claim 4 wherein the bead (46) comprises a slope (48) in the longitudinal direction of the wiper rubber element (10).

6. A spare wiper element according to claim 1, wherein a side opposite the wiper rubber (10) the holding clamp (30) includes at least one protruding rib (50) as a stop for a claw (26) or a clawed yoke (27).

7. A spare wiper element according to claim 6, wherein in the area of transition zones between the web (40) and lateral shanks (41) each holding clamp (30, 31) comprises a rib (50) protruding from the web surface.

8. A spare wiper element according to claim 7 wherein the clamp (30, 31) is formed from a metal sheet.

9. A spare wiper element according to claim 7, wherein the clamp (30, 31) is made of a plastic material.

10. A spare wiper element according to claim 1 wherein the spring bars (21) are held in the respective longitudinal grooves (20) by two holding clamps (30, 31) of which either is arranged with a short distance from the end of the wiper rubber (10).

11. A spare wiper element according to claim 1, wherein one holding clamp (60) forms a structural unit with a substantially conically ending mounting mandrel (61) and that said holding clamp (60) is fixed onto an end area of a wiper rubber (10) so that the said mounting mandrel (61) protrudes over the end area of the wiper rubber (10).

12. A spare wiper element according to claim 11, wherein the mounting mandrel (61) has a cross section which is adapted to an interior space between the claws (26) of a clawed yoke (27).

13. A spare wiper element according to claim 12, wherein holding webs (42) of the holding clamp (60) fixed onto the end of the wiper rubber (10) have a serration (62).

14. A spare wiper element according to claim 13, wherein a wall thickness of the holding clamp (60) is smaller than a spacing between inner surfaces (63) of the claws (26) of the clawed yoke (27) and outer surfaces (64) of the basic body (11) of the wiper rubber (10).

* * * * *